Dec. 10, 1968 F. LÉVY 3,415,308
METHOD AND MEANS FOR PREVENTING THE DEPOSIT OF
VAPOR AND RIME ON WINDOWS AND WINDSHIELDS
Filed Nov. 17, 1966

INVENTOR

FELIX LEVY

BY McGlew and Toren

ATTORNEYS

United States Patent Office 3,415,308
Patented Dec. 10, 1968

3,415,308
METHOD AND MEANS FOR PREVENTING THE DEPOSIT OF VAPOR AND RIME ON WINDOWS AND WINDSHIELDS
Felix Lévy, Quartier des Collettes, Cagnes-sur-Mer, Alpes-Maritimes, France
Filed Nov. 17, 1966, Ser. No. 595,119
Claims priority, application France, Nov. 22, 1965, 7,686
9 Claims. (Cl. 165—2)

ABSTRACT OF THE DISCLOSURE

An arrangement for preventing the deposit of vapor and rime on the surfaces of windows is formed by a pair of glass panes separated by a gap. A conduit is connected at its inlet and outlet ends to the gap and combines with it to form a closed circuit. Air is circulated through the conduit and the gap. As the air passes through the conduit it is heated, next it is cooled to remove any moisture it contains, and finally, the dry air is heated and returned to the gap in a continuous flow operation.

My invention has for its object a method and means for preventing atmospheric pressure from settling as vapor or rime on windows and window glasses. The arrangement thus provided is applicable in all cases and in particular to the windows of air-port control towers for which it is essential that the window panes remain transparent whatever atmospheric conditions may be prevailing, also to shop, office and home windows, to windshields on automobiles, ships, command stations and the like.

My novel arrangement which resorts to the use of double glass panes provides for the flow in the gap between the two panes of a stream of air passing in succession through heating means followed by a cooler adapted to subject the moisture to a sudden drop in temperature which causes it to form a deposit in said cooler, through further heating means in which the air released of its moisture is reheated and finally through the gap between the two window panes where the air abandons the heat absorbed by it in the further heating means before returning to the first heating means so as to form a closed circuit in which it is continuously recycled. The cooler can be constituted by a mere heat exchanger the walls of which carry fins so as to be cooled by the surrounding atmosphere, the temperature obtained in the first heating means being chosen in a manner such that the steam carried along by the air passing out of said heating means may readily condense upon return to ambient temperature. Said cooler is preferably designed so as to provide an exhaust for the water condensed therein.

In the application of my invention to automobiles, the exhaust gases or hot water in the radiator may be used for the heating means. The speed of the automobile increases thus the efficiency of the heat exchanger cooled by the external atmosphere.

In all cases, the circulation of air between the two glass panes may be furthered by a small fan located at any point of the circuit but preferably beyond the cooler.

It should also be remarked that it is of interest to ensure a continuous desiccation of the air stream through the described procedure of heating followed by cooling in spite of the reduced capacity of the circuit by reason of the external air always entering the circuit through small clearances.

The accompanying drawing illustrates diagrammatically an arrangement according to the invention.

Figure 1:
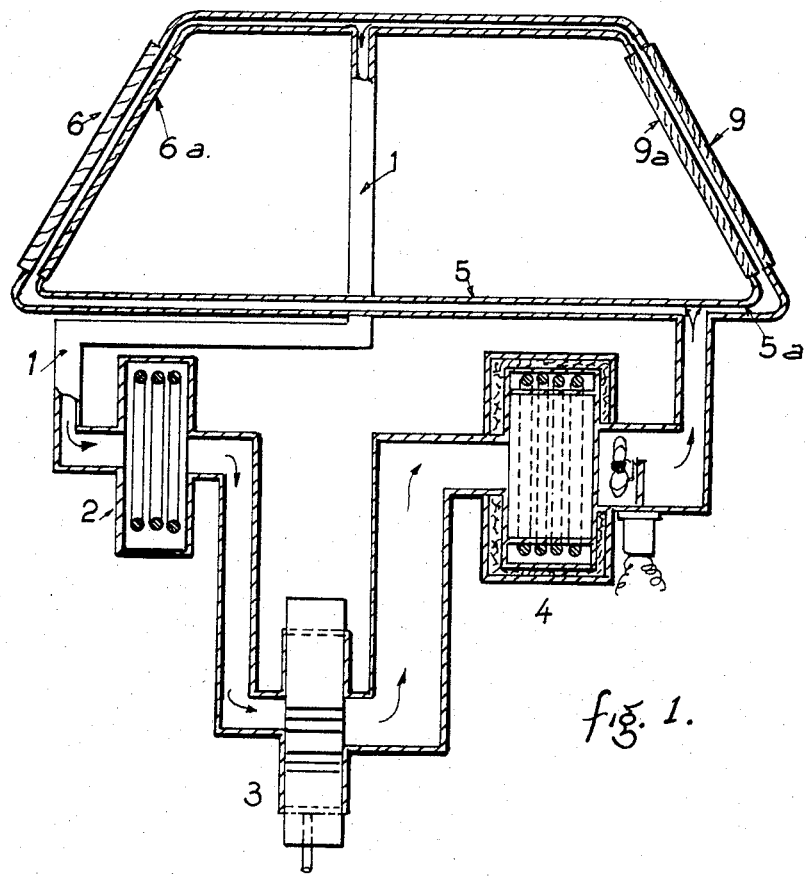
FIG. 1 is a general view thereof.

The air in the circuit which is fully laden with the moisture at the start or which has absorbed some amount of moisture with external atmospheric air entering the circuit is fed through the channel 1 into the first heating means 2 out of which it passes directly into a heat exchanger 3 where its sudden drop in temperature causes it to condense and to deposit its moisture. It thenafter enters the heating means 4 the walls of which are heat-insulated and thence it is led in a dry and hot condition through a preferably also heat-insulated channel 5 into the gap between the two glass panes 6-6a after which it returns to its starting point at 1 and starts executing a further cycle similar to that described. A small fan 10 is provided for an active circulation of the air.

Figure 2:
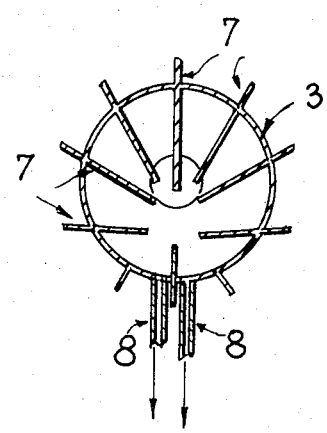
FIG. 2 is a cross-section of a preferred embodiment of the cooler.

FIG. 2 shows how the cooling may be executed simply by the external air. The walls of the heat-exchanger 3 are provided with cooling fins both inwardly and outwardly, the inner fins being shaped so that the condensed water deposited thereon may flow towards the bottom of the apparatus and be exhausted therethrough one or more output ports 8. Obviously, however, any other type of heat exchanger may be used.

In FIG. 1 showing the invention as applied to an automobile, I have illustrated diagrammatically at 6—6a the windshield which latter is possibly associated with lateral window panes and is fed with hot dry air through the channel 5 while the double panes 9-9a forming the back light are fed through the pipe 5a shunted off the channel 5.

What I claim is:

1. A method of preventing the deposit of vapor and rime on windows such as automobile windows and the like which are exposed to varying atmospheric conditions comprises the steps of forming a gap between a pair of panes of glass, forming a closed circulation circuit including the gap, heating the air within the closed circuit after removing it from the gap, cooling the heated air within the closed circuit for removing moisture from the air, and heating the thus dried air in the closed circuit, and recycling the air to the gap between the panes of glass.

2. A method, as set forth in claim 1, and comprising the step of force circulating the air through the closed circulation circuit.

3. A method as set forth in claim 1, comprising the step of insulating the circulation circuit for at least the portion of its path wherein the heated dry air is delivered into the gap.

4. An arrangement for preventing the deposit of vapor and rime on the surfaces of windows comprising a pair of windows disposed in relatively closely spaced relationship for forming a gap therebetween, a conduit connected at its inlet and its outlet ends to the gap between the panes of glass and combining therewith to form a closed circuit, a heater located in said conduit near the inlet end thereof for heating air received from the gap, a cooler located in said conduit downstream from said heater for cooling the air received from the heater and condensing any moisture contained in the air, and a heater located in said conduit downstream of said cooler for heating the dried air before the air is recirculated through the gap.

5. An arrangement, as set forth in claim 4, wherein a fan is positioned in said conduit for circulating air through said closed circuit.

6. An arrangement, as set forth in claim 4, wherein at least a portion of said conduit is insulated between the second heater and the outlet from said conduit into the gap.

7. An arrangement, as set forth in claim 4, wherein said cooler has its exterior surface in contact with the surrounding atmosphere for cooling the air circulated through the interior of the cooler.

8. An arrangement, as set forth in claim 7, wherein cooling fins are provided for said cooler extending from the interior thereof to the exterior whereby the exterior portions of the fins are cooled by the atmosphere and the interior portions of the fins cool the air passing through the cooler and provide a surface for the condensation of any moisture within the air passing therethrough.

9. An arrangement, as set forth in claim 8, wherein said cooling fins slope downwardly from the interior surface of said cooler whereby moisture condensing on the fins passes downwardly along the surfaces of the fins to the lower portion of the cooler, and a drainage outlet in the lower end of said cooler for removing condensed moisture thereform.

References Cited

UNITED STATES PATENTS

| | | | |
|---|---|---|---|
| 2,570,808 | 10/1951 | Hermes | 34—77 |
| 2,706,387 | 4/1955 | Swanson | 62—248 |
| 2,947,152 | 8/1960 | Bloem | 165—179 |

FOREIGN PATENTS 357,737  10/1931  Great Britain.

MEYER PERLIN, *Primary Examiner.*

CHARLES SUKALO, *Assistant Examiner.*

U.S. Cl. X.R.

165—30, 54, 111, 179; 62—248